United States Patent [19]
Reid

[11] 3,983,702
[45] Oct. 5, 1976

[54] HYDRAULIC ENERGY EXTRACTOR

[76] Inventor: Alister Ure Reid, "Kyleakin," Norrels Drive, East Horsley, Surrey, England

[22] Filed: Jan. 20, 1975

[21] Appl. No.: 542,120

[30] Foreign Application Priority Data
Jan. 25, 1974 United Kingdom................. 3585/74

[52] U.S. Cl. ................................................. 60/501
[51] Int. Cl.² ....................................... F03B 13/12
[58] Field of Search .............................. 60/495–505

[56] References Cited
UNITED STATES PATENTS

| | | | |
|---|---|---|---|
| 583,821 | 6/1897 | Sager | 60/504 |
| 1,615,556 | 1/1927 | Stamworth | 60/503 |
| 1,627,996 | 5/1957 | Perkins | 60/503 |
| 2,470,313 | 5/1949 | Levin | 60/496 |

FOREIGN PATENTS OR APPLICATIONS

| | | | |
|---|---|---|---|
| 406,134 | 6/1922 | Germany | 60/503 |
| 369,026 | 3/1932 | United Kingdom | 60/497 |
| 725,431 | 3/1955 | United Kingdom | 60/495 |

*Primary Examiner*—Allen M. Ostrager
*Assistant Examiner*—H. Burks
*Attorney, Agent, or Firm*—Fidelman, Wolffe & Waldron

[57] ABSTRACT

A hydraulically operated prime mover comprises a liquid reservoir having a relatively large surface area at an upper level and connected via a lock to a waste liquid area at a lower level, the lock containing a relatively closely fitting deep-draught buoyant float which extends above the flotation level by an amount at least equal to the draught and an energy transfer device which extracts the potential energy from the float over substantially the entire stroke when it rises and falls between its two buoyant positions in the lock corresponding to the upper and lower liquid levels.

8 Claims, 29 Drawing Figures

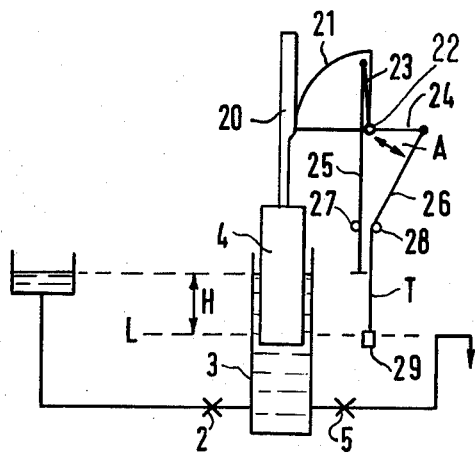
FIG. 2(a)
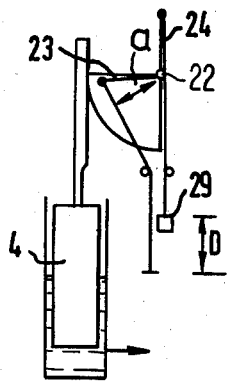
FIG. 2(b)
FIG. 2(c)
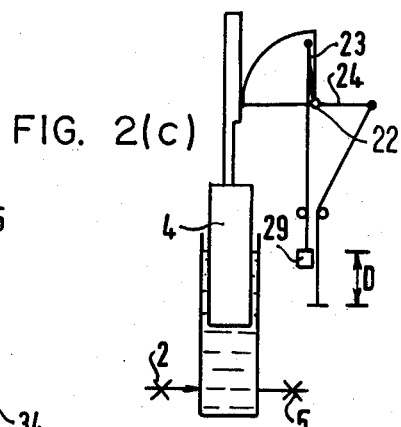
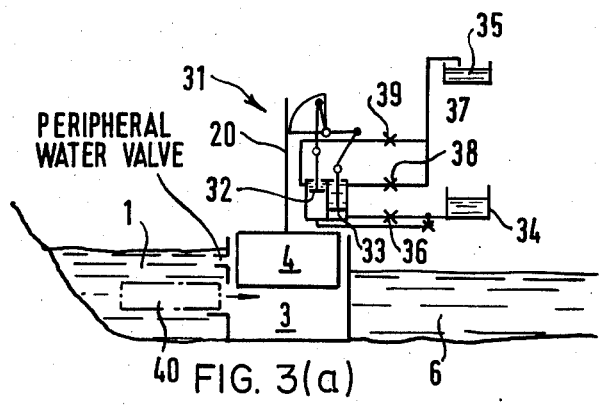
FIG. 3(a)
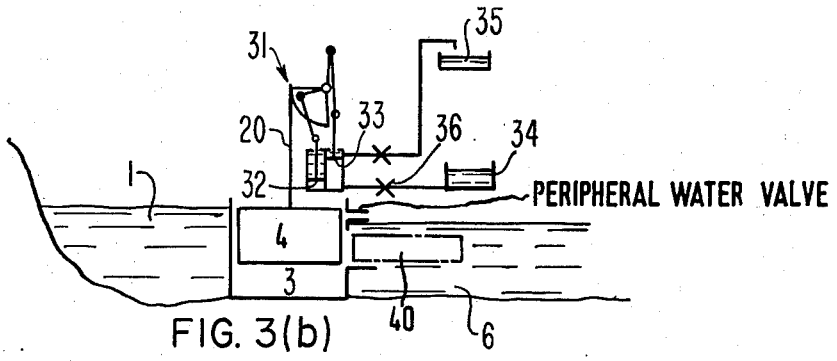
FIG. 3(b)

HYDRAULIC ENERGY EXTRACTOR

This invention relates to a hydraulic prime mover and is more specifically concerned with one capable of extracting energy from relatively low heads of liquid with a relatively high efficiency.

Conventionally turbines are used for extracting energy from heads of liquids. For high heads of liquid the bucket or pelton-type turbine is commonly used. For low heads of liquid reaction turbines such as the kaplan turbine are used. Both forms of turbine require high capital installation costs involving the construction of massive concrete structures such as barrage dams, expensive turbine equipment, and fairly massive ancillary equipment such as intakes, valving and pinstocks.

Although reaction turbines are usable with liquid heads as low as 10 feet, economic considerations normally dictate minimum heads of 17 to 30 feet which must always be present as the turbine is essentially a continuously running energy converter. Although very large sources of potential energy are available with heads of less than 20 feet and produced, for example, by tidal flows, the recovery of such energy at an overall efficiency greater that 25 percent has not been achieved on any major scheme.

An object of this invention is the provision of a hydraulic prime mover able to operate with relatively low heads of liquid, that is to say heads as low as a few feet.

In accordance with one aspect of this invention a hydraulically operated prime mover comprises a liquid reservoir having a relatively large surface area at an upper level and connected via a lock to a waste liquid area at a lower level, the lock containing a relatively closely fitting deep-draught buoyant float which extends above the flotation level by an amount at least equal to the draught and an energy transfer device which extracts the potential energy from the float over substantially the entire stroke when it rises and falls between its two buoyant positions in the lock corresponding to the upper and lower liquid levels.

In accordance with a second aspect of the invention a hydraulically operated prime mover comprises a liquid reservoir having a relatively large surface area at an upper level and connected via a lock to a waste liquid area at a lower level, the lock containing a relatively close fitting buoyant float whose draught is not less than the difference in maximum and minimum liquid levels in the lock and which extends above the level at which it floats by at least the same amount, an energy transfer device, means to control the raising and lowering of the liquid in the lock between the two levels, and a mechanism, if necessary, for holding the float in the upper buoyant position while the peripheral liquid in the space between the float and the lock is discharged so inducing potential energy in the float which is extracted by the device when the float is subsequently released and descends to the new buoyant position while further liquid is discharged from the lock. The above procedure is repeated in reverse when peripheral water around the float is supplied from the upper reservoir, further energy being extracted as the float returns to the upper buoyant position while liquid enters the lock from the upper reservoir to replace the liquid which was discharged during the downward movement of the float.

In accordance with a third aspect of the invention a hydraulically operated prime mover comprises a liquid reservoir having a relatively large surface area at an upper level and connected via a lock to a waste liquid area at a lower level, the lock containing a relatively closely fitting buoyant float whose draught is not less than the difference in maximum and minimum liquid levels in the lock and which extends above the level at which it floats by at least the same amount, an energy transfer device connected between the float and a separate installation such as a pump alongside the lock, valving controlling the rise and fall of the liquid level in the lock, a mechanism, if necessary, for holding the float in its upper and lower buoyant positions when the height of peripheral liquid between the float and the lock wall is changing between the maximum and minimum levels in the lock, and closable large wall openings in the lock to allow liquid to flow rapidly from the lock during descent of the float and into the lock during ascent of the float during its down and up working strokes which each occur after the release of the mechanism, the energy being extracted over the complete up and down strokes with full discharge of the primary water.

The use of a relatively closely fitted floating solid in the lock in place of liquid enables the potential energy of the difference in levels between the two sides of the lock to be largely retained in the float when the peripheral liquid lying between the float and the wall of the lock is drained away. As the quantity of peripheral liquid involved is small, such drainage can occur quickly and then the downstream side of the lock can be opened because the levels on either side have been equalized. Subsequent lowering of the float into the lock is accompanied by a further discharge of liquid from the lock until the float is again buoyant at the level of liquid in the lock which is now equal to that on the downstream side. The amount of energy extracted by the transfer device is nearly equal to half the potential energy of the water in the lock at the maximum liquid level relative to the minimum liquid level, minus the energy loss represented by the draining away of the peripheral liquid. As long as the float has a draught equal to the distance in heads between the two sides of the lock and conforms externally to the inside wall of the lock fairly closely, the amount of peripheral liquid drained away is quite small and between 40 and 45 percent of the energy available in the lock when filled from the reservoir can be extracted via the transfer device.

After the float has descended to its lowermost position in the lock the downstream side of the lock can be closed and the upstream side opened to raise the float to its uppermost position in the lock.

Provided that the float extends above the level at which it floats by an amount which is greater than the difference in levels in the two reservoirs, then a similar amount of energy can be extracted during the upward stroke when the float returns to near the starting position. A buoyant body of steel or concrete may be used. A lock measuring 150 feet in length and 40 feet wide containing a single close fitting float or assembled from two or more smaller floats could be operated to provide approximately 160 foot tons of potentially convertible energy for each foot difference in the operating levels of the reservoirs.

The energy transfer device may include a pump associated with a high liquid storage from which a supply of liquid at a substantially constant head can be obtained.

The energy transfer device includes a torque converter in which the weight of the float is applied as a torque which diminishes as the load descends but which is opposed by a diminishing countertorque produced by a load on the converter. Such a converter may take the form of a quadrant rack which is turned about a pivot as the float descends and which raises an arm between two predetermined positions during such descent. Suspended from the arm is a cable carrying the load and which passes round a pulley disposed beneath the fulcrum around which the rack quadrant is arcuate. As the arm is raised between its two positions, the countertorque it exerts on the rack opposing the descent of the float becomes less and diminishes to zero before the float is finally buoyant in the liquid in the lock.

At the end of the descending stroke the load can do work and the cable transferred to a second arm also capable of being raised between two positions so that as the float ascends as the lock refills, the second arm is raised against a diminishing torque to again transfer energy to the load during the upward movement of the float. The two loads may be provided by piston pumps which raise liquid from a low-level reservoir to a high-level reservoir to provide a conventional water accumulator.

The invention will now be described in more detail by way of examples, with reference to the accompanying drawings, in which:

FIGS. 1(a) to 1(f) show diagrammatically six stages in the working of a hydraulic prime mover;

FIGS. 2(a) to 2(c) show three stages in the operation of a torque converter usable in the arrangement of FIG. 1;

FIGS. 3(a) and 3(b) show diagrammatically how the Hydraulic prime mover and torque converter may be used in practice to supply a hydraulic accumulator;

Figure 1A:
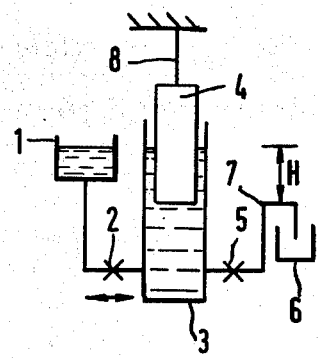
Figure 1B:
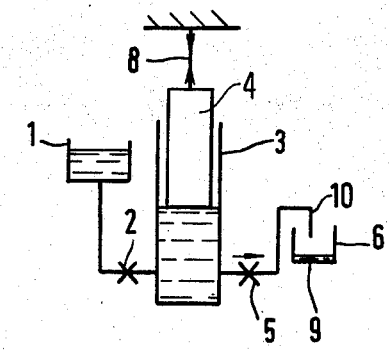
Figure 1C:
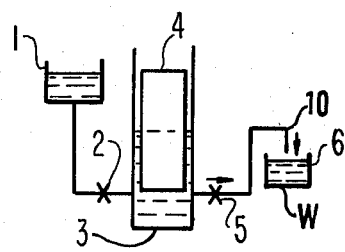
Figure 1D:
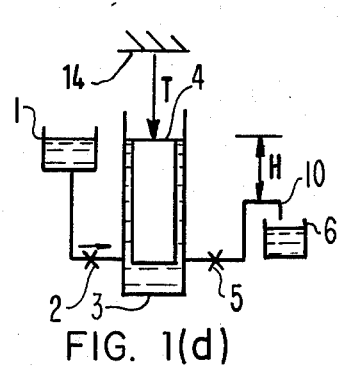
Figure 1E:
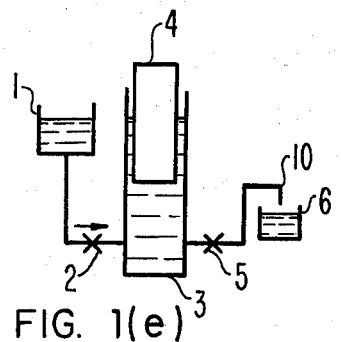
Figure 1F:
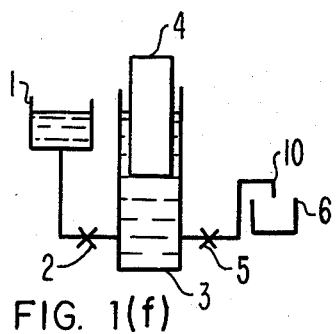

FIGS. 6(a) to 6(i) show the construction and operation of a large diameter output pump with a replaceable cylinder wall liner and a single arm torque converter as an alternative to the double arm converter shown in FIGS. 2 and 3; and FIGS. 7(a) to 7(f) show a large multiple-float lock with side charging and discharging of the primary water as an alternative to the end charging and discharging shown in FIG. 3.

In FIG. 1 a high-level reservoir 1 of water having a substantial surface area is connected by a valve 2 to a lock 3 containing a float 4 of uniform cross-section which fits closely the inside contour of the lock wall. An outlet controlled by a second valve 5 extends from the lower half of the lock to a waste water receiver 6. An inverted U-bend 7 in the outlet determines the extent of emptying of the lock 3 and the water level in the reservoir 1 determines the extent of filling of the lock 3.

The rise and fall of water in the lock therefore occurs over a distance H.

The sketches (a) to (f) show stages in one complete sequence of operation of the prime mover. In sketches (a) to (f) the float 4 is shown in its uppermost position and floating in the liquid in the lock 3 so that a support cord 8 attached to its upper end is slack. At this time the valve 2 is open and the valve 5 is closed.

If now the valve 2 is closed and the valve 5 is opened a volume of water 9 collects in the receiver 6 and is equal to the peripheral water between the float 4 and the side of the lock 3. As the float 4 is a close fit within the lock the amount of water 9 is quite small and drains away very rapidly through the open valve 5. The floating 4 remains stationary during the drain-off of the peripheral water and its increase in weight from zero is transferred to the cord 8. It will be observed that the draught of the float extends through the entire distance H as the underside of the float is at or beneath the level 7. The float now represents a store of potential energy which can be extracted in the form of work as the cord 8 is let out to allow the float 4 to descend into the lock. During this descent the water tends to rise around the float but the valve 5 is still open and, assuming its cross-section is sufficiently great or can be increased sufficiently by opening additional valves or sluices, then the water level will rise in the lock by a small amount as the float descends sufficiently to displace water out through the open valve 5 until the float 4 is once again buoyant at its lower position shown in sketch (c).

The sequence of stages (a) to (c) represent half of one cycle during which the float has descended through the height H and, ignoring frictional losses, the only wasted energy is that represented by the water collected in the receiver 6 in sketch (b). The useful energy extracted is equal to half the weight of water in the lock occupying the height H and displaced by the float 4 which, being buoyant, is equal in weight to the weight of water it displaces in the lock in sketch (a).

Sketches (d) to (f) indicate the return stroke of the prime mover. The outlet valve 5 is now closed and the inlet valve 2 is opened. It is assumed for test purposes that the volume of water in the reservoir is so large that its level remains constant and the water now entering the lock from the reservoir 1 rises as peripheral water around the float, which extends above the level at which it floats by an amount which is greater than the difference in levels in the two reservoirs and urges it upwards against the thrust of a counterforce 14. The upward thrust on the float caused by its buoyancy is available for extraction. Further water is admitted into the lock and the float rises up until it attains the position shown in sketch (e). The valve 2 is now closed as shown in sketch (f) and it will be recognized that the cycle has been completed with the part once again in the position shown in sketch (a). The work done by the float is moving between the position shown in sketch (d) to the position shown in sketch (f) is approximately equal to the work done during the stages shown in sketches (a) to (c). As the weight of water collected in the receiver 6 in sketch (b) is solely a function of the peripheral water between the float and the lock sides, and can be made quite small. Therefore the prime mover can operate over one cycle of two strokes with an efficiency exceeding 80 percent and approaching 90 percent with a relatively small difference in heads represented by the distance H.

FIG. 2 shows a form of torque converter usable with the reciprocating float 4 and which has the advantage that the countertorque produced by a load to which the energy of the float is transferred, is maintained at a value less than the torque produced by movement of the float so that the float 4 is able to move through the height H during each stroke. Parts of FIG. 2 corresponding to FIG. 1 are similarly referenced. Only the lock 3 however is shown but it will be understood to be worked in the same way as has been described already with reference to FIG. 1.

The float 4 carries a vertical rack 20 which meshes with a quadrant rack 21 arcuate and also rotatable about a fulcrum 22. Attached to the quadrant 21 are two arms 23 and 24. Each arm carries at its end one end of a cable 25, 26 passing around pulleys 27, 28 located beneath the fulcrum 22. A load 29 is transferable between the lower ends of the cables 25, 26 to provide the countertorque.

In FIG. 2, sketch (a) the load 29 produces a tension T in the cable 26 which in turn produces a component force T.sin A at right angles to the arm which produces a torque acting about the fulcrum 22 equal to S.T. sin A where S is the length of the arm 24 and A is the angle made by the cable 26 with the arm.

The float 4 is held, if necessary, in the upper position while the peripheral water is discharged to the level L. The float 4 is then released and as it descends it rotates the quadrant rack 21. The torque produced during this descent diminishes as the effective weight of the float decreases. The water continues to discharge through the open outlet valve during this descent and simultaneously the weight 29 is raised by counterclockwise movement of the arm 24. The countertorque produced by the weight 29 is such that it also diminishes. This is because the component of the torque force T sin A diminishes as the arm 24 rotates to a vertical position.

The descent of the float 4 is accompanied by a lifting of the weight 29 through a distance D. This is acquired potential energy. The acquired energy of weight 29 can then be translated into work allowing it to descend through the distance D and to be connected to the lower end of the cable 25 which is attached to the second arm 23.

The outlet valve 5 is now closed and the inlet valve 2 is opened to flood the lock. With the float if necessary held in the lower position, the introduction of the peripheral water during the flooding of the lock induces an upward thrust in the float 4 and when the float is released, it exerts a torque on the toothed quadrant 21 which is opposed by a countertorque exerted by the weight 29 at the lower end of the cable 25. The situation is similar to the down stroke but in this case, the float 4 rises up causing the arm 23 to rotate to the vertical position while lifting the weight 29 through the distance D. The countertorque diminishes to zero in the same way as before as the arm 23 approaches the vertical so that the float is able to resume the uppermost buoyant position as shown in FIG. 2 (c).

The weight 29 can now be lowered through the working distance D and transferred back to the end of the cable 26 to resume a fresh cycle.

From the above description it will be appreciated that the changing effective weight of the float is transferred into potential energy of a fixed weight.

FIG. 3 shows in two sketches (a) and (b) a commercial realisation whereby the parts shown in FIGS. 1 and 2 are used together to extract tidal energy from a barriage constructed across an estuary.

In FIG. 3 the trapped water behind the barrage 30 provides the upper reservoir 1 and the lock 3 is disposed between the reservoir 1 and the sea providing the receiver 6. The torque converter of FIG. 2 is shown driving a pump 31 having two pistons 32, 33 operating in anti-phase and which each has a lifting working stroke at which it transfers water from a lower half 34 of a water accumulator to an upper half 35 by way of valve-controlled piping 36, 37.

The lock 3 is rectangular in plan and is provided with hinged sides rather than ends, one side opening into the reservoir and the other side opening into the sea. A concrete float 4 weighing 500 tons is located within the lock and has a draught equal to the maximum difference in heights between high and low water and extends above the flotation level by the same amount. The concrete float is a close fit within the lock to keep the peripheral water to a minimum and thereby speed the operation of the lock. Each vertical stroke of the float 4 is accompanied by the passage of a corresponding block of water through the lock and shown diagrammatically at 40. A valve at each end of the lock is used if necessary to pass the peripheral water. Even on a large scale, the peripheral water is unlikely to exceed 3 percent of the amount of water to be discharged in each half cycle and a conventional paddle valve is adequate to pass this quantity of water fairly quickly. Because the peripheral water represents only a small quantity in terms of volume, the lock level rapidly attains the level in reservoir 1 and if the float is held, if necessary, in the lower position with valve 39 closed, then the corresponding side of the lock can be opened as a single opening or as a series of openings when the float can be released by opening valve 39 and it will rise rapidly as the lock fills with water passing through the opening.

The upward movement of the float which takes place as the water is let in produces the upward stroke of the piston 32 of the pump. The control valve and the reservoir 1 side of the lock are then closed and the control valve which exhausts the peripheral water to the sea is opened. Again the levels in the lock and the sea quickly equalize and if the float is held if necessary, this time in the upper position with valve 38 closed, the sea side of the lock can be opened and when the float is released with the opening of valve 38 the main quantity of water 40 is discharged to the sea during the downward working stroke of the float 4 which produces the upward stroke in piston 33.

A particular advantage of the arrangement shown is that the energy available in tidal working varies during the tidal cycle and it is therefore necessary to store some of the extracted energy in order to provide a balanced supply and also to store the energy extracted during the night and other off-peak times for use during peak demand. In practice, the arrangement shown in FIG. 3 converts the potential energy of a large quantity of water at a low head into a much smaller quantity of water at a high head from which it can be used to run a turbine in a conventional water accumulator.

The machine can also be used to extract energy from a low head run-of-river scheme (say 5 ft. head or less) and used to pump up water to a system of irrigation channels in order to send the water long distances over a flat delta area or plain.

Various alternatives to the way of carrying out the invention described are possible and some of these alternatives are shown in FIGS. 4, 5, 6 and 7.

Figures 4, 4A:
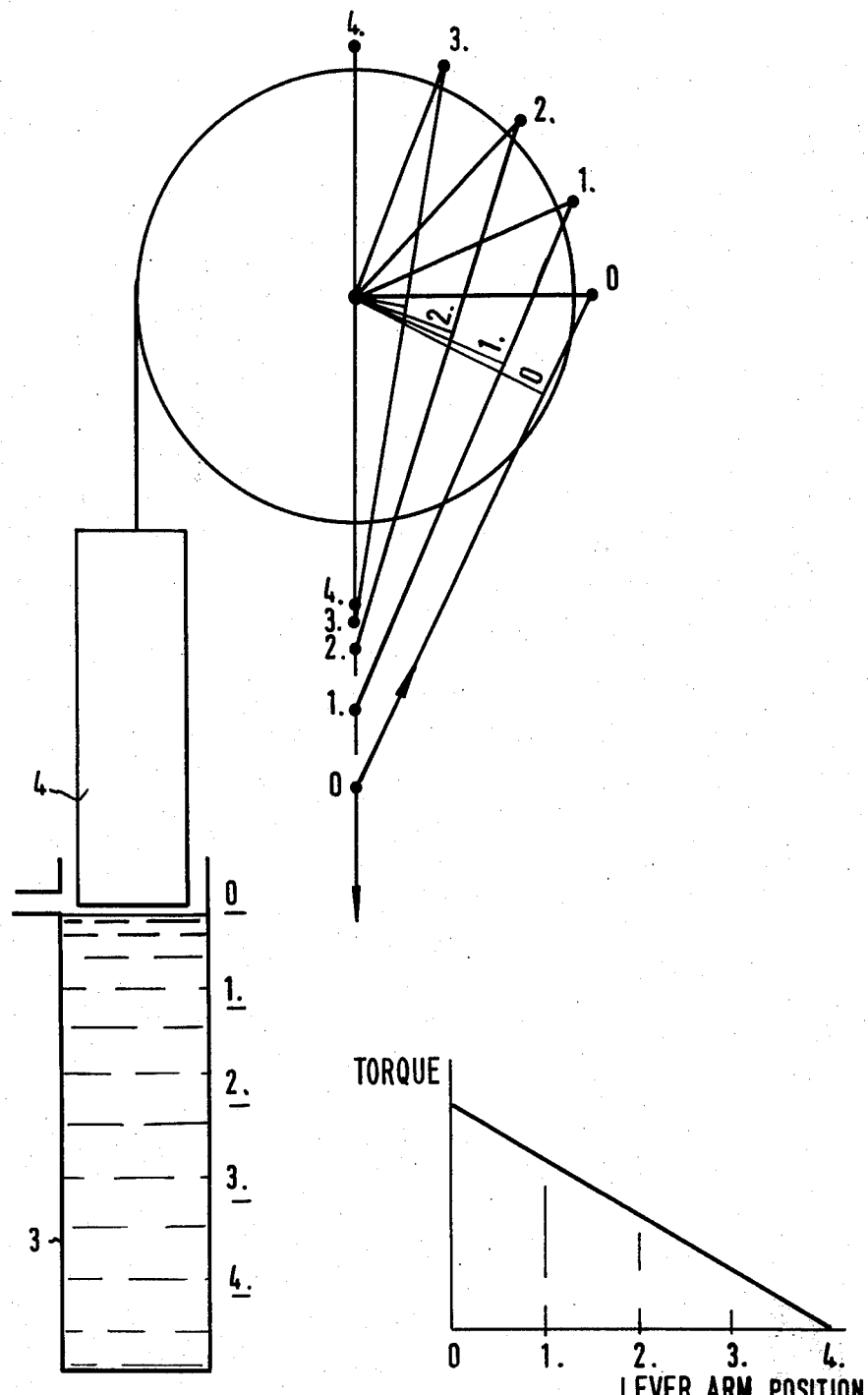
FIG. 4 shows a pin jointed linkage for use as a torque converter as an alternative to the cable operated converter used in FIG. 2.
FIG. 4a shows the lever arms for the position of the float of FIG. 4.

FIG. 4 shows diagrammatically a pin jointed linkage mechanism as part of the torque converter, the effective lever arm being given in FIG. 4 for the five positions of the float 4 as it descends into the lock 3.

Figure 5:
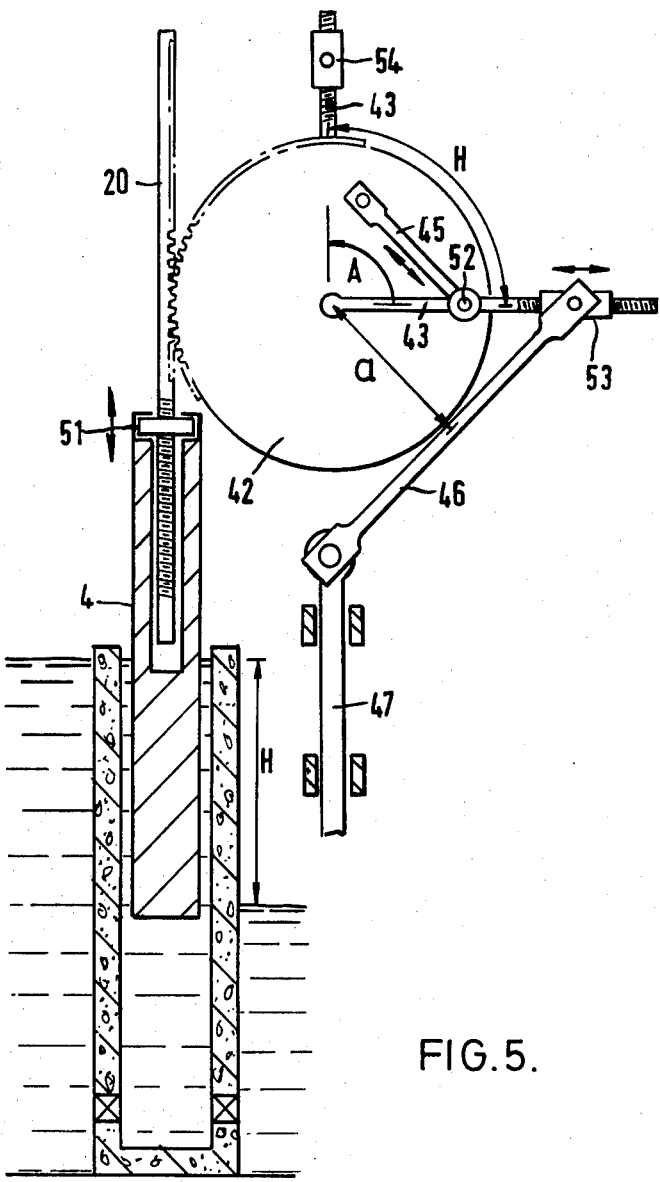
FIG. 5 shows the provision of four adjustments in the mechanism of FIGS. 2 and 4 to allow for various operating conditions.
Figure 6A:
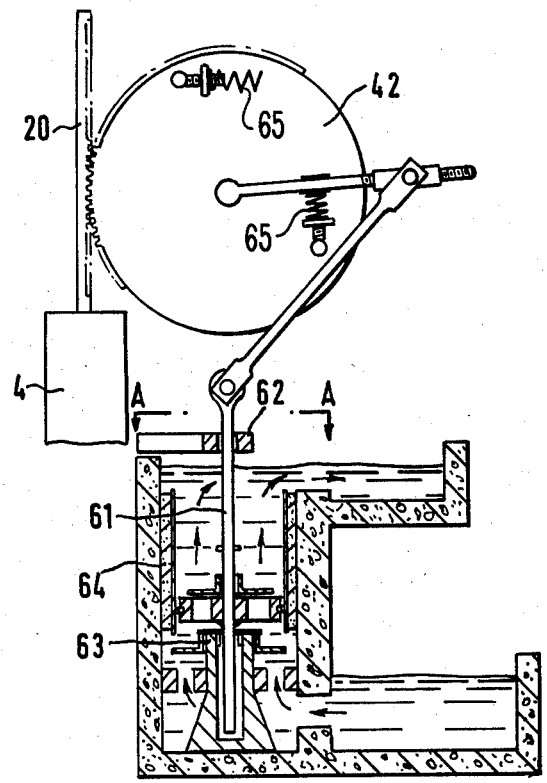
Figure 6B:
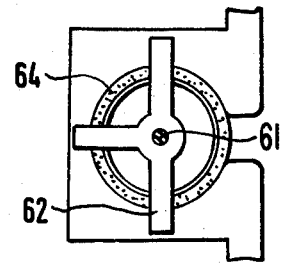
Figure 6C:
Figure 6D:
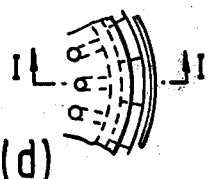
Figure 6E:
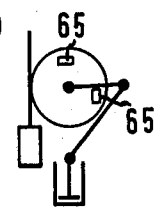
Figure 6F:
Figure 6G:
Figure 6H:
Figure 6I:
Figure 7A:
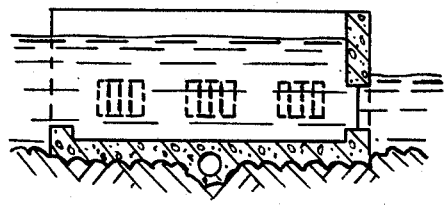
Figure 7C:
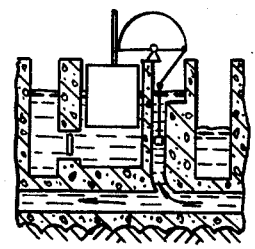
Figure 7B:
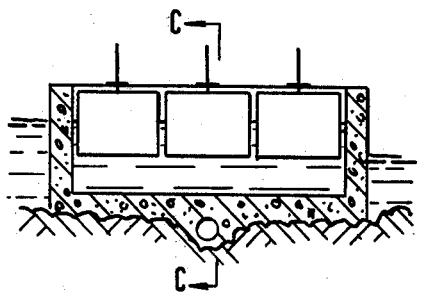
Figure 7E:
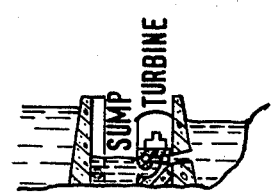
Figure 7D:
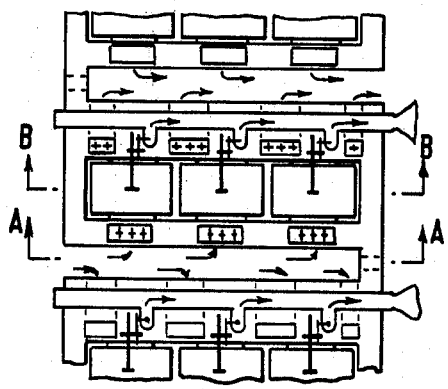
Figure 7F:
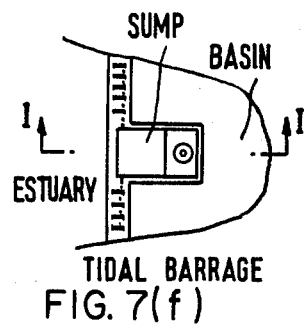

FIG. 5 shows the linkage in more detail. A toothed wheel 42 engaging rack 20 attached to the float 4 carries levers 43 on each side, the levers 43 being attached at one end to the pivot 44 of the wheel 42 and being connected to the wheel 42 by links 45. Levers 43 are each connected to a connecting rod 46 connected to an operating rod 47 mounted for rectilinear movement and driving the load (not shown). Four possible adjustments are shown. Adjustment 51 is required to keep the float in the correct operating range while the tide is rising and falling, this adjustment being made intermittently during the cycle. Adjustment 52 is required to maintain the angle A so that the arc is less than H. Adjustments 53 and 54 are required to ensure that the initial lever arm $a$ of the load torque is less than the initial torque produced by the float.

FIG. 6 shows an output pump discharging to a low head say 40 ft. and this arrangement would require very large diameter pumps, say in excess of 10 ft. In this case, the piston rod 61 is constrained to move vertically through an upper and a lower guide 62 or 63 and a cylinder wall liner 64 would be grouted into position while the piston rod and head are raised through the stroke distance so ensuring good alignment. An alternative piston ring arrangement is shown in 6(d) with interlocking segments pressed against the cylinder wall by the water pressure in the cylinder on the up stroke and withdrawn away from the cylinder wall by the drop in pressure during the down stroke assisted by the shape of the segments.

FIGS. 6(e) to 6(i) show a single arm torque converter with the working illustrated in the five operational stages. Springs 65 (or other pressure devices) are compressed in stages 7(e) and (g) by the weight of the piston rod etc. but this compressive force is removed as the arm approaches top dead centre thus allowing the spring to extend and project the arm past top dead centre where the weight of the piston rod etc. will pull the arm down to the next starting position (g) amd (i).

FIG. 7 shows a lock with primary water sluices on the side of the lock instead of at the ends for a very large lock, there would be a time delay while the block of water 40 in FIG. 3 passes into and out of the lock but this delay is kept to a minimum with the side charging and discharging from channels which connect alternately with the estuary and basin. The figure shows the output water being pumped from a sump via a conduit passing under the Barrage and discharging to either the basin or the estuary (whichever is at the lower level) and a turbine is shown operating on the steady head between the basin and the low level sump at a head say 40 ft. ± 5 ft.

From the above description it will be appreciated that the underlying principle of the applicant's invention is that the insertion of a close fitted floating solid into a lock in substitution for the water with fluid properties, permits the retention of the potential energy of the difference in head of the water at the different levels when the peripheral water is discharged and the retained energy is thereby available to do work outside the lock and hydraulic system when the displaced water is discharged out of the lock at the lower water level with minimum head. The torque converter mechanism ensures that this work is extracted over the complete stroke with full discharge of the primary water over the operating range.

I claim:

1. A hydraulically operated prime mover comprises a liquid reservoir having a relatively constant head at an upper level and connected via a lock to a waste liquid area at a lower level, the lock containing a relatively closely fitting deep-draught buoyant float which extends above the flotation level by an amount at least equal to the draught and an energy transfer device which extracts the potential energy from the float over substantially the entire stroke when it rises and falls between its two buoyant positions in the lock corresponding to the upper and lower liquid levels, said energy transfer device comprising a mechanism to which the weight of the float is applied as a torque which diminishes as the float descends but which is opposed by a diminishing countertorque produced by a load on the mechanism gaining potential energy.

2. A hydraulically operated prime mover comprises a liquid reservoir having a relatively constant head at an upper level and connected via a lock to a waste liquid area at a lower level, the lock containing a relatively closely fitting buoyant float whose draught is not less than the difference in maximum and minimum liquid levels in the lock and which extends above the level at which it floats by at least the same amount, an energy transfer device comprising a mechanism to which the weight of the float is applied as a torque which diminishes as the float descends but which is opposed by a diminishing countertorque produced by a load on the mechanism gaining potential energy, means to control the raising and the lowering of the liquid in the lock between the two levels, and a mechanism if necessary for holding the float in the upper buoyant position while the peripheral liquid in the space between the float and the lock is discharged so inducing potential energy in the float which is extracted by the energy transfer device when the float is subsequently released and descends to the new buoyant position while further liquid is discharged from the lock.

3. A prime mover as claimed in claim 2, having a mechanism for holding the float in the lower position wherein the procedure is arranged to be repeated in reverse when peripheral water around the float is supplied from the upper reservoir, further energy being extracted as the float is subsequently released and returns to the upper buoyant position while liquid enters the lock from the upper reservoir to replace the liquid which was discharged during the downward movement of the float.

4. A hydraulically operated prime mover as claimed in claim 2 wherein the means to control the raising and the lowering of the levels in the lock comprise closable large side wall openings in the lock to allow liquid to flow rapidly from the lock during descent of the float and into the lock during ascent of the float.

5. A hydraulic prime mover as claimed in claim 2, wherein the torque actuated mechanism includes a lever arm arranged to be rotated by the rise and fall of said float, said lever arm being connected to said load in such a way that said countertorque exerted by the load decreases as increased immersion of said float in the liquid in said lock decreases the effective weight of said float.

6. A hydraulic prime mover as claimed in claim 5, wherein the lever arm is connected to the load by means of a cable.

7. A hydraulic prime mover as claimed in claim 5 wherein the lever arm is connected to the load by means of a connecting rod and operating rod mounted for rectilinear movement.

8. A hydraulic prime mover as claimed in claim 5, wherein the float is connected to a rack which engages a toothed wheel or quadrant driving or forming the lever arm.

* * * * *